Figure 1:
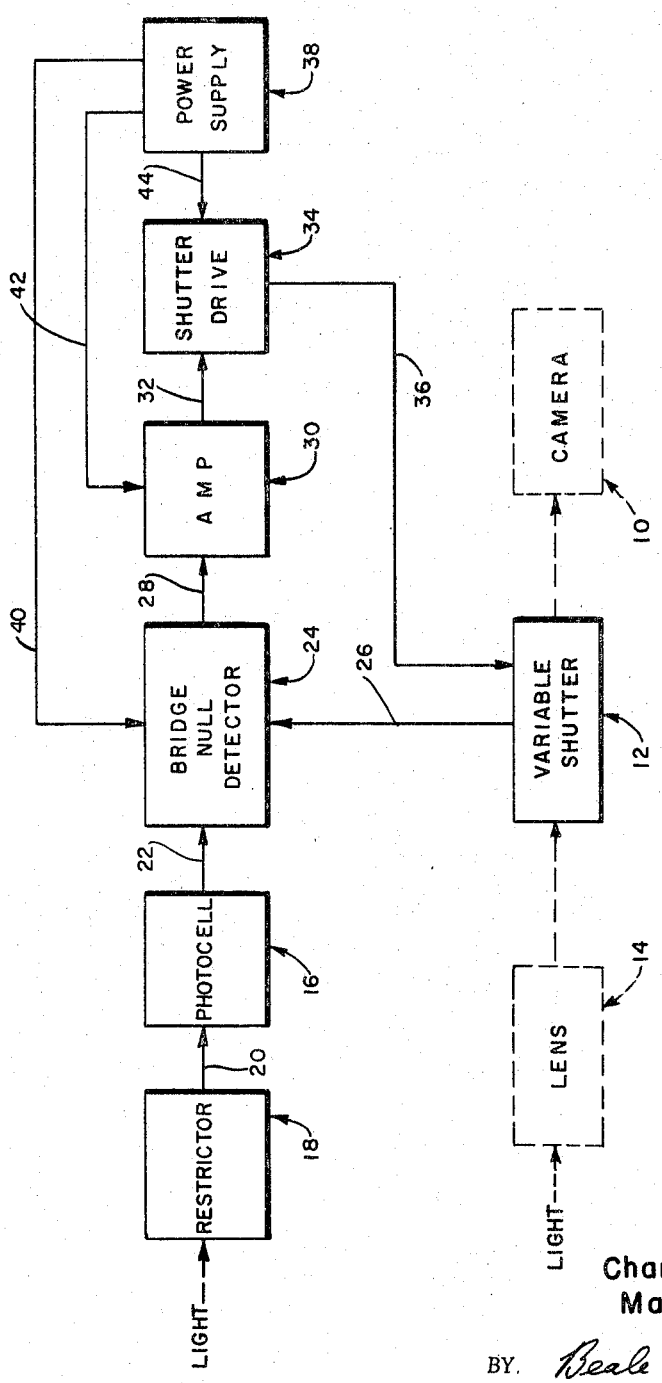

INVENTORS
Charles A. Gregory, Jr. &
Malcolm S. McKenney

BY Beale and Jones
ATTORNEY

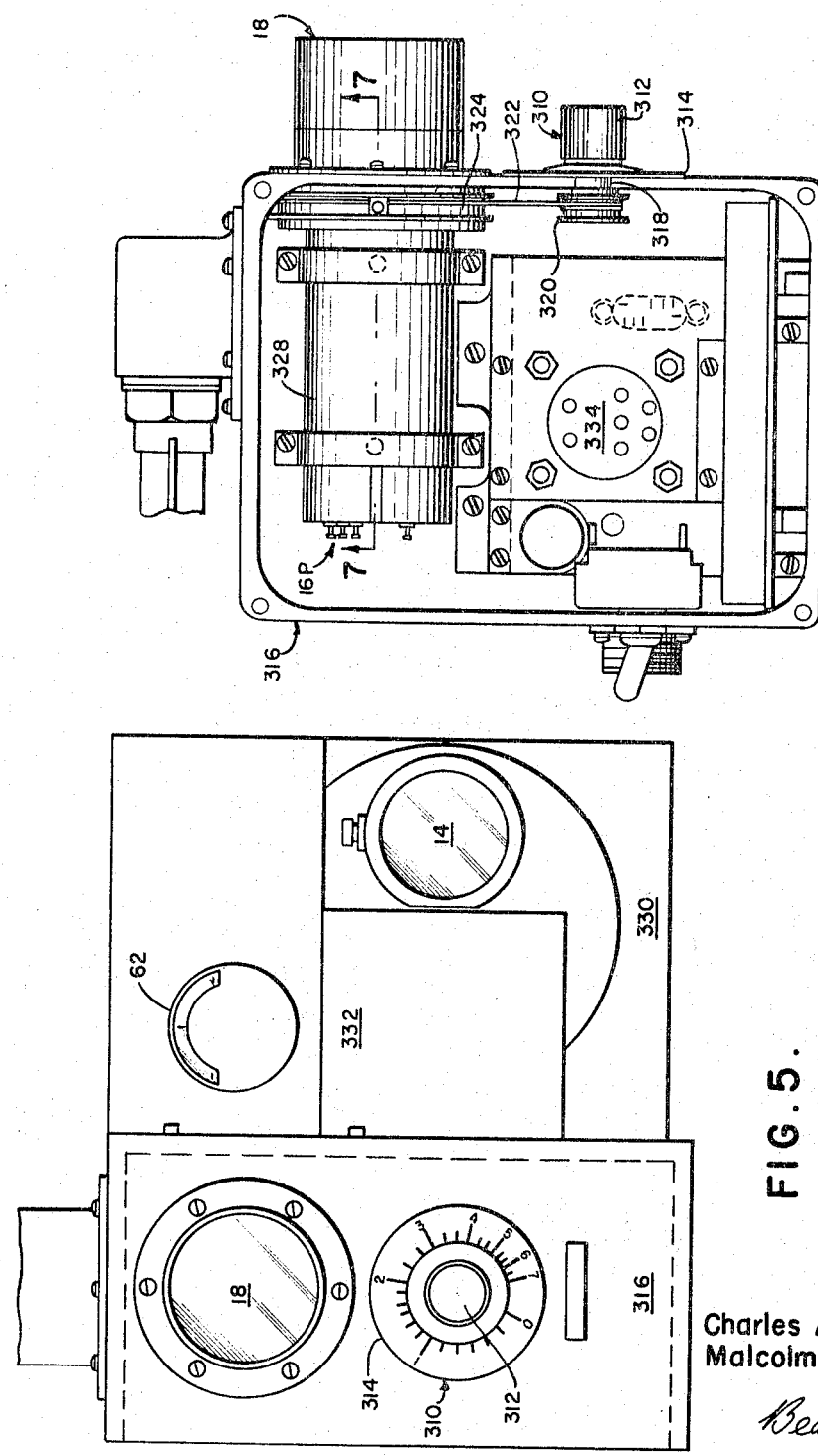

United States Patent Office 3,327,186
Patented June 20, 1967

3,327,186
AUTOMATIC EXPOSURE CONTROL FOR
CAMERA LENS
Charles A. Gregory, Jr., and Malcolm S. McKenney, Richmond, Va., assignors to Giannini Scientific Corporation, a corporation of Delaware
Original application Feb. 25, 1963, Ser. No. 260,659, now Patent No. 3,230,847, dated Jan. 25, 1966. Divided and this application Oct. 31, 1963, Ser. No. 327,168
13 Claims. (Cl. 318—28)

This is a division of application Ser. No. 260,659 filed Feb. 25, 1963, now Patent No. 3,230,847.

This invention relates to automatic exposure control systems for cameras and the like and more particularly, to automatic exposure control systems of the electronic servo type.

In determining the proper film exposure for a given lens setting there are a number of variables to consider. For example, for a given f/number and corresponding light condition a particular exposure time or shutter speed is necessary in order to achieve optimum results. This particular arrangement of variable is a somewhat standard approach to setting up the operating format of various known cameras.

However, in cameras with multiple frame techniques such as those used in aerial photography, the shutter speeds are constant over extended periods during which a series of consecutive photographs are being taken.

With the exposure time thus held constant, the only solution which remains for exposure control is to automatically vary the amount of light reaching the film. A change in the f/number or f/stop setting of the camera lens is therefore in order.

Conventionally, the f/stop setting controls the size of the aperture of an iris diaphragm located in front of a camera lens, the f/number being an indication of the relative size of the focal length of the lens and the diameter of the aperture.

Another means for controlling exposure is the use of a constant speed rotary shutter wherein the angle between the shutter blades may be varied to vary the size of the rotating sector and hence the time of exposure of the film. It is to the automatic adjustment of the blade angle in this rotary type shutter to which this invention is specifically directed. However, automatic adjustment of an iris diaphragm may also be effected by this invention.

A rotary shutter and means for adjusting same is the subject matter of a copending application to Gregory, Jr., et al., entitled, "Variable Shutter Mechanism," Ser. No. 156,453, filed Dec. 1, 1961, now Patent No. 3,186,003.

Automatic exposure controls, in the past, have been operated based on functions of light intensity as the controlling inputs for the various systems used. While this type of input function is necessary to achieve some form of automatic exposure control, the output characteristics of an exposure controlling servo system are not readily adaptable to the format of the adjustment mechanisms conventionally desired for cameras.

Accordingly, it is an object of this invention to provide an automatic exposure control system wherein the input is a function of light intensity and the output is a proportional function of the camera lens f/stop numbers, over a given range of f/stop numbers, whereby the automatic adjustment provided is directly adapted to the format of the camera.

Another object of this invention is to provide an automatic exposure control comprising a photoconductive input transducer and servo means energized by said transducer as a function of the intensity of the incident light on said transducer, including feedback means for varying the response characteristics of said transducer in response to said incident light, whereby the response of said automatic exposure control is proportional to camera lens f/stop numbers.

Another object of this invention is to provide an automatic exposure control comprising a photoconductive input transducer and servo means energized by said transducer as a function of the intensity of the incident light on said transducer including feedback means for varying the response characteristics of said transducer in response to said incident light, whereby the response of said automatic exposure control is proportional to camera lens f/stop numbers, wherein said feedback means includes a variable resistor in circuit with said photoconductive input transducer and means for automatically varying said resistor.

Another object of this invention is to provide an automatic exposure control including a photoconductive input transducer having a separate lens system from that of the main camera lens, the separate lens system being provided with the same acceptance angle as the main lens system and being boresighted to aim in a line parallel to the centerline of the main camera lens, whereby the separate lens system sees the same area as the main camera lens, and further including a selectively adjustable iris diaphragm in the separate lens system to thereby bias the said input transducer for any given camera operating conditions.

Still another object of this invention is to provide an automatic exposure control for cameras incorporating novel null-balance circuitry.

Still another object of this invention is to provide an automatic exposure control for cameras incorporating novel null-balance circuitry adapted to be unbalanced in response to variations in light intensity, and power control servo means proportionally energized in response to the degree of unbalance thereof to automatically rebalance said circuitry and simultaneously vary the shutter setting of a camera as a function of the f/stop numbers thereof.

These and other objects of this invention will become apparent with reference to the following specification and drawings which relate to several preferred embodiments of the invention.

Figure 2:
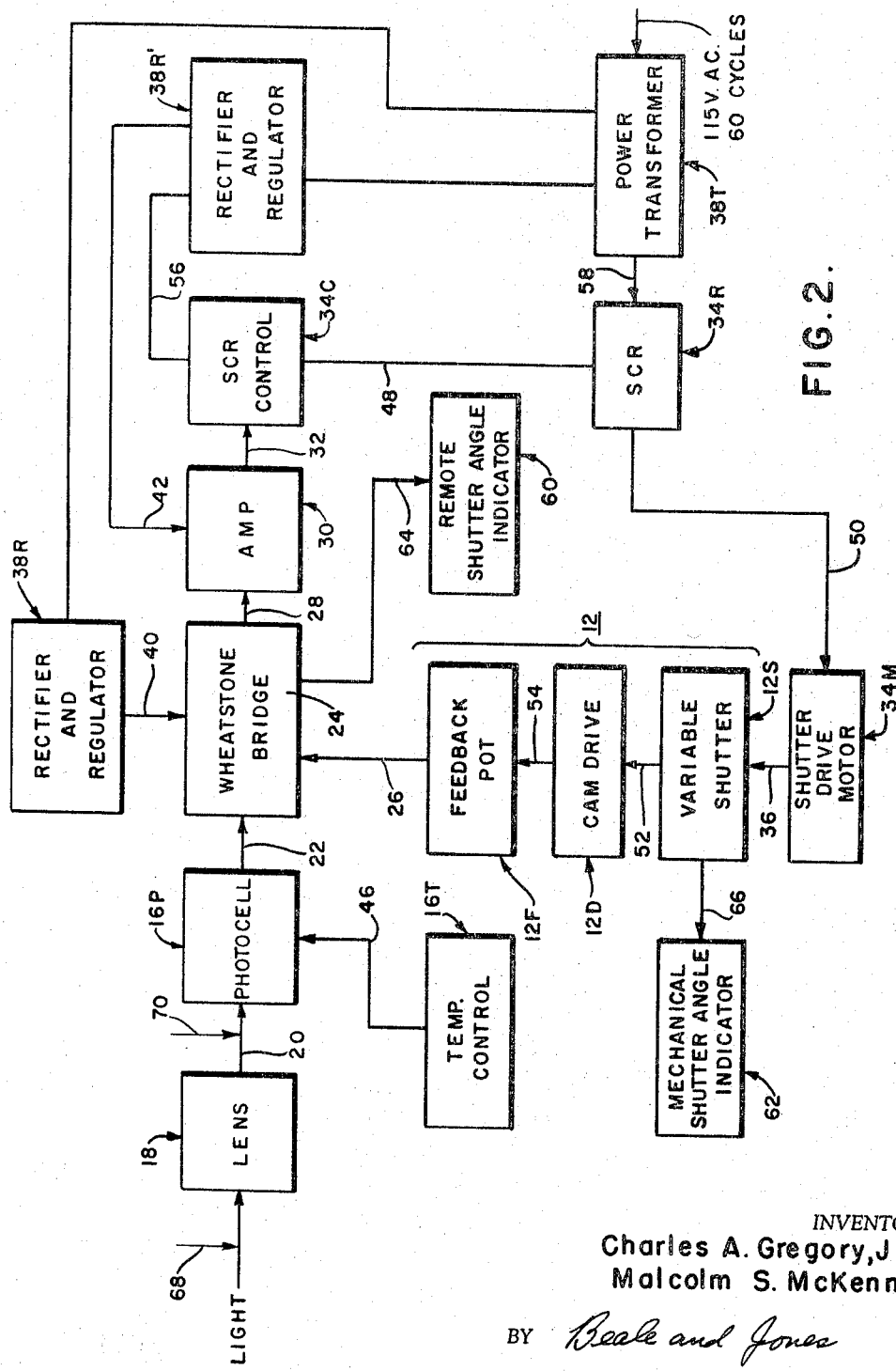
Figure 3:
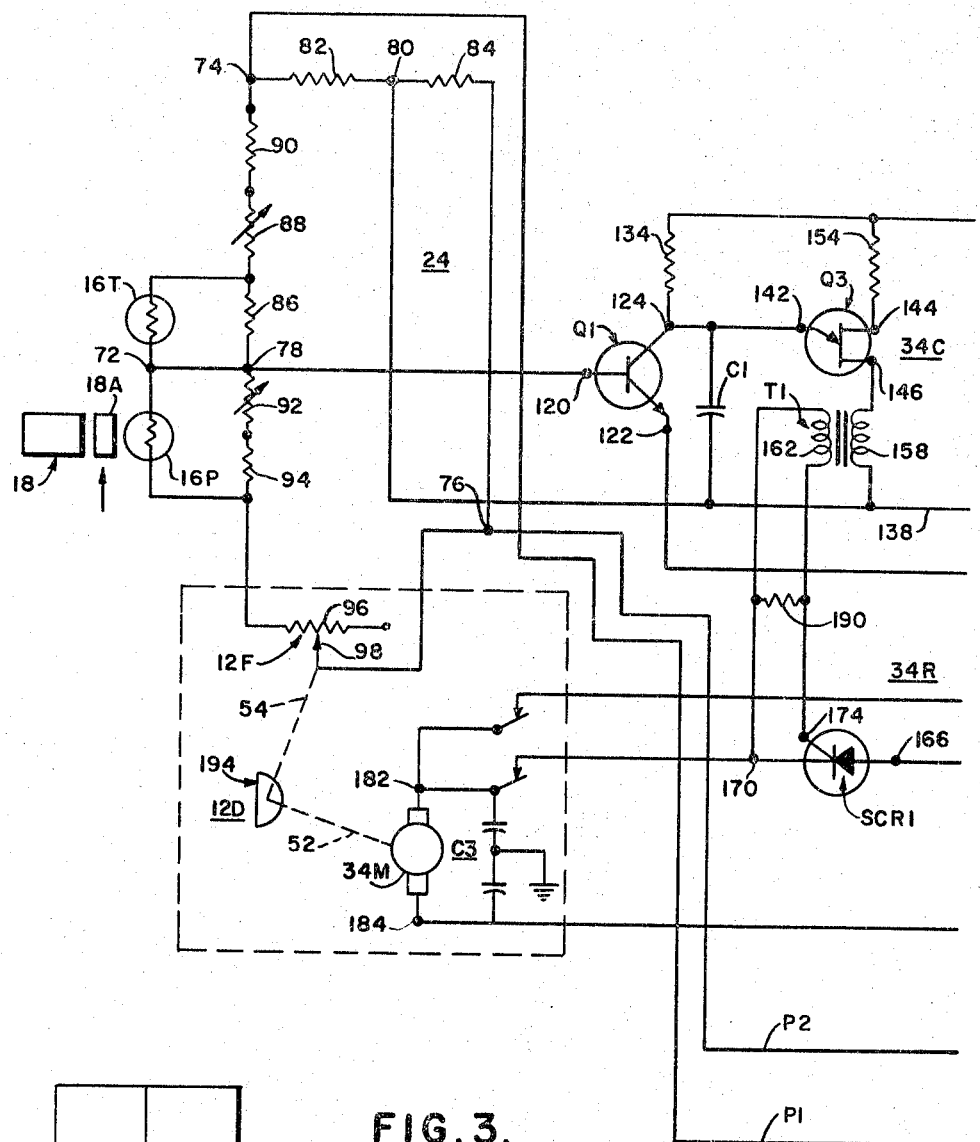
Figure 3A:
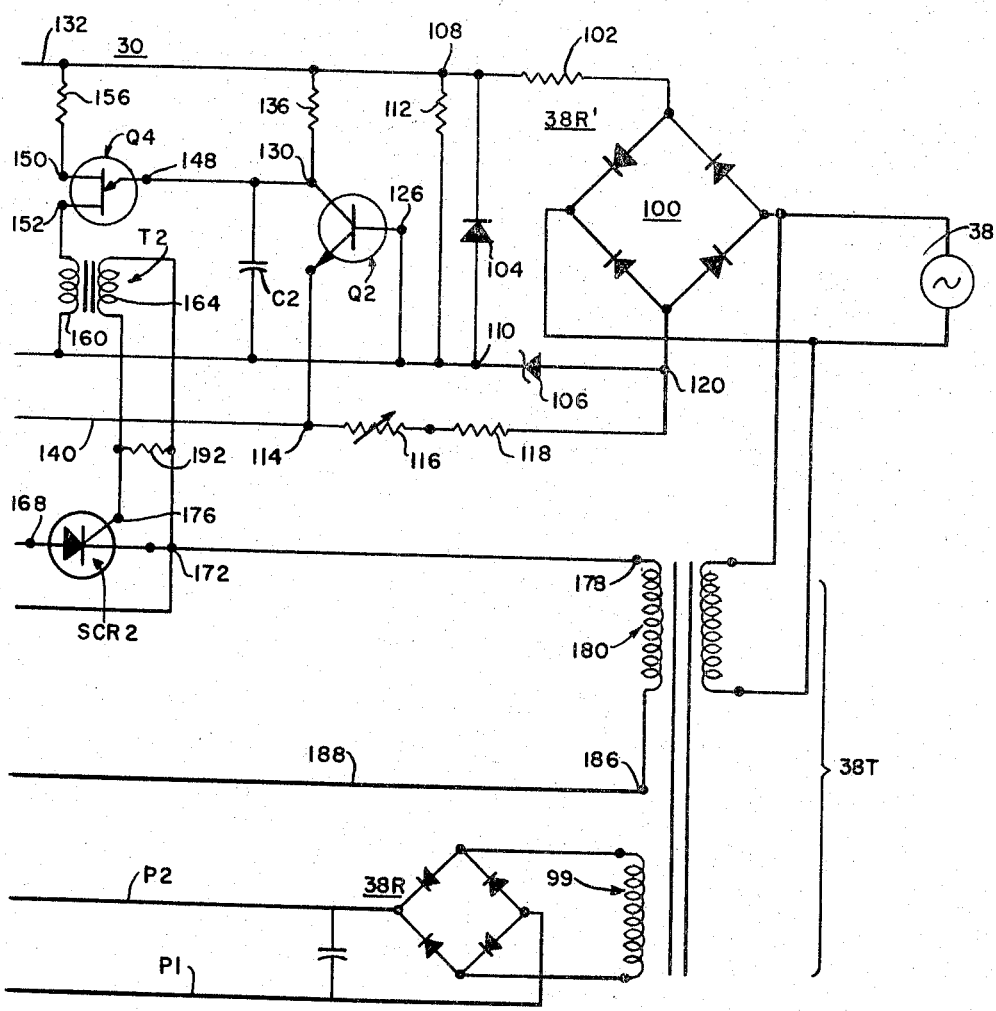
Figure 4:
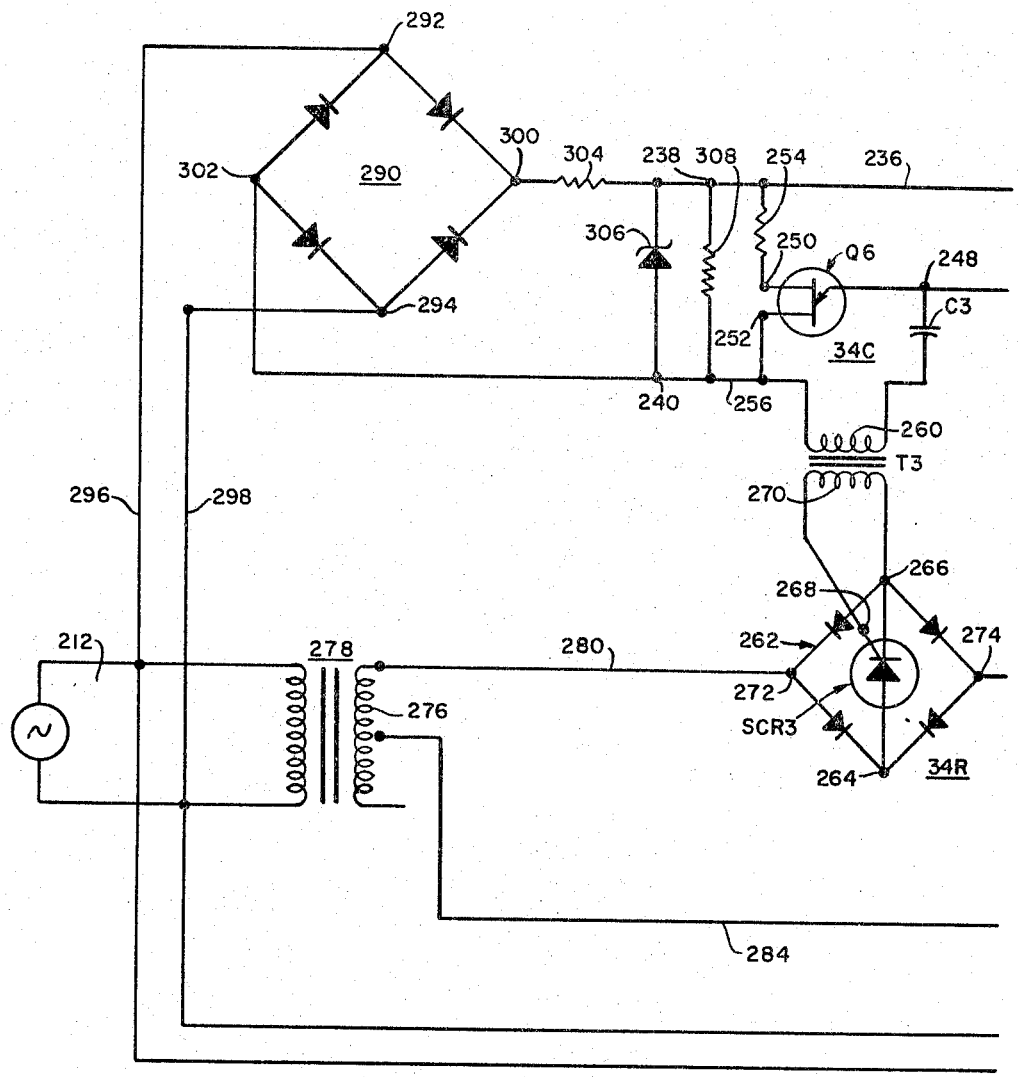
Figure 4A:
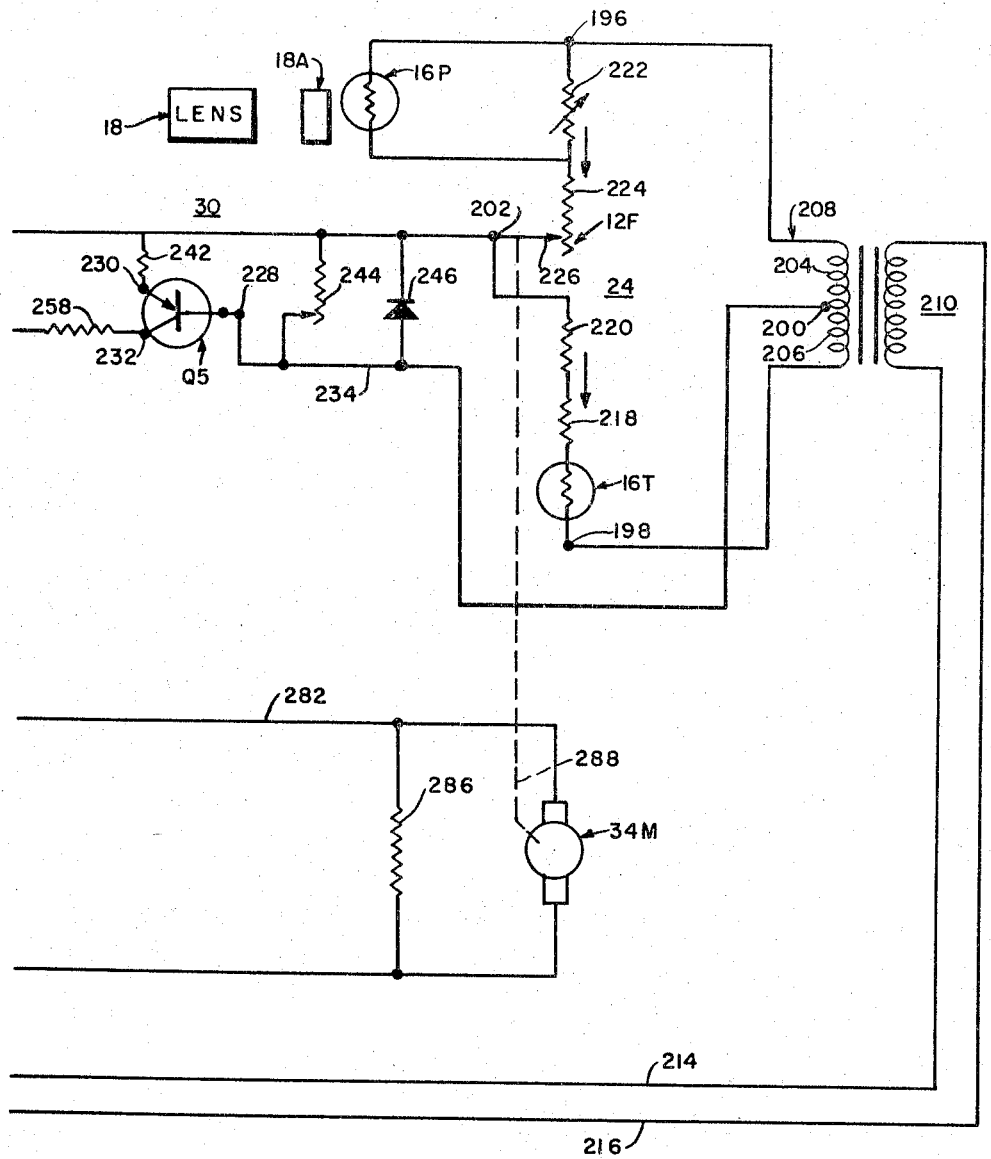
Figure 7:
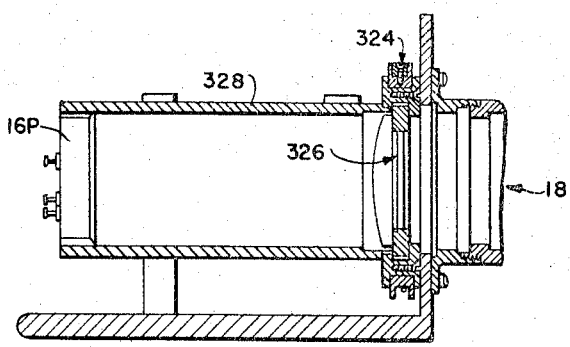
Figure 8:
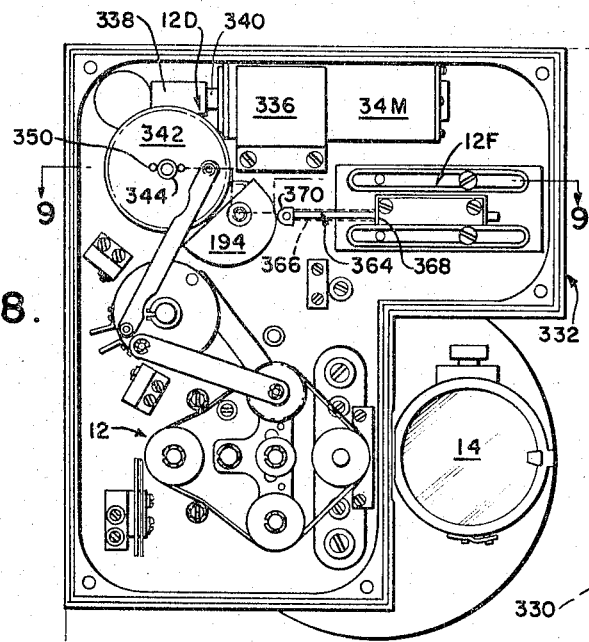
Figure 9:
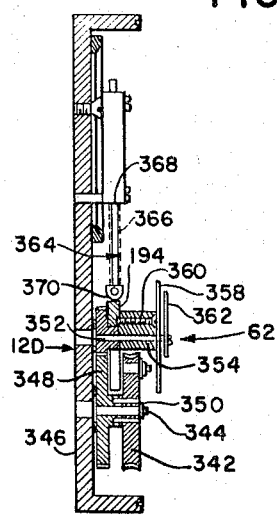

In the drawings:
FIGURE 1 is a general block diagram of the invention;
FIGURE 2 is a more specific block diagram of the invention;
FIGURES 3 and 3a are, taken together, a schematic of one embodiment of the invention;
FIGURES 4 and 4a, are, taken together, a schematic of another embodiment of the invention;
FIGURE 5 is a front end view showing the separate lens system and adjusting means for the input transducer of the invention adjacent the main camera structure;
FIGURE 6 is a side elevation of FIGURE 5 with one side of the casing removed;
FIGURE 7 is a detailed cross-section taken along line 7—7 of FIGURE 6.
FIGURE 8 is a detailed internal elevation of a portion of FIGURE 5 with the front cover plate removed; and
FIGURE 9 is a detailed cross-section taken along line 9—9 of FIGURE 8.

I. THE BASIC SYSTEM OF FIGURE 1

The invention may be broadly described with reference to FIGURE 1 in which a camera means 10 including a variable rotary shutter means 12 and a primary lens system 14 is shown.

In order to control the degree of exposure of the film in the camera means 10 by automatically varying the blade angle adjustment of the rotary shutter means 12 as described in the said copending application supra, a light sensing and transducer means 16 is provided having a separate or secondary lens system 18, including selectively variable light restricting means (not shown), with an acceptance angle equal to the acceptance angle of the primary lens system 14. The secondary lens system 18 is of the gunsight type and is aimed by boresighting or the like along a line parallel to the centerline of the primary lens system 12, whereby the two lens systems both see the same area and light conditions.

The light conditions of the area to be photographed are fed to the sensor means 16 from the secondary lens system 18 via an input 20 which in reality is an optical path.

The output response of the transducer in the sensor means 16 is connected via an input connection 22 to a null-balance bridge type detector circuit 24.

A second input connection 26 on the bridge circuit 24 is provided to connect an output signal indicative of the present adjusted position of the variable shutter means 12 to the null-balance bridge circuit 24 to be compared to the output signal from the sensor means 16.

The output signal from the bridge circuit 24, which is proportional to the unbalance generated therein in response to the differential in the signal representative of actual light conditions in the area to be photographed and those for which the shutter means 12 is set, in fed through an input connection 28 to a servo amplifier 30.

The output response of the amplifier 30 is a control signal which is fed through an input connection 32 to the control means (not shown) of a variable shutter drive and adjustment means 34 which is drivably connected with the variable shutter means 12 by means of a connection generally indicated as an input 36.

A servo loop is thus established which begins with the null-balance bridge circuit 24 and progresses through the servo amplifier 30, a shutter drive means 34 and variable shutter means 12, back to the said bridge circuit 24.

Operating power for all of the operational elements of the servo loop is supplied from a power supply 38 via power connections 40, 42 and 44 to the bridge circuit 24, amplifier 30 and shutter drive means 34, respectively.

The system of the invention having been broadly set forth, the means for providing the automatic control of the rotary shutter means 12 of FIGURE 1 by means of the servo loop defined in the description of that figure, are more specifically illustrated in FIGURE 2 and will now be described.

II. THE EMBODIMENT OF FIGURE 2

Referring now to FIGURE 2, wherein like numerals to FIGURE 1 indicate like elements, the sensor means is shown as comprising a photoconductive device 16P and a thermoelectric temperature compensating means 16T therefore, interconnected as generally indicated by the connection 46.

The output of the photoconductive transducer 16P is introduced to the servo loop at the first input 22 of the bridge circuit 24 and the resulting response of the said bridge circuit is fed to the input 28 of the servo amplifier 30.

The amplifier output is fed to the input 32 of a control circuit 34C in the variable shutter control means which means further comprises a silicon controlled rectifier (SCR) power regulator gate 34R controlled by the control circuit 34C, and a shutter drive motor 34M selectively energized by the power gate 34R.

The output of the control circuit 34C comprises a gating control pulse, to be hereinafter more fully described as to its derivation, which is fed to the input 48 of the SCR power gate 34R.

The regulated power output of the SCR power gate 34R is fed to the shutter drive motor 34M via a connection 50. As generally indicated in FIGURE 1, the output of the drive motor 34M is connected via a coupling 36 to the shutter means 12. As specifically shown in FIGURE 2, the coupling 36 extends between the drive motor 34M and the variable shutter mechanism 12S of the shutter means 12.

The shutter means 12 further comprises an output cam drive 12D, coupled to the variable shutter mechanism 12S a connection 52 and thus driven by motor 34M, and a feedback potentiometer 12F coupled via a connection 54 through the cam drive 12D and connection 52 to the shutter mechanism 12S, whereby the said feedback potentiometer is adjustably positioned in response to the adjusted position of the variable shutter mechanism.

The output of the feedback potentiometer 12F provides the necessary error signal for the servo loop and is applied to the second input 26 of the null-balance bridge circuit 24.

The power supply is shown as comprising a power transformer 38T feeding the null balance bridge circuit 24 via a first rectifier and regulator means 38R and power lead 40 and feeding both the servo amplifier 30 and the control circuit 34C via power leads 42 and 56, respectively. A separate lead 58 is provided directly from the transformer 38T to the SCR power gate 34R.

Further refinements over the general system of FIGURE 1 are the use of a remote reading shutter adjustment indicator 60 and a mechanically driven local shutter adjustment indicator 62. The remote indicator 60 is connected to an output of the bridge circuit 24 via a suitable lead 64. The local indicator 62 is mechanically coupled to the shutter mechanism 12S via a connection 66.

As indicated by the arrow 68, a sunshade may be provided for the input side of the secondary lens system 18. The use of a variable density optical filter positioned between the secondary lens system 18 and the photoconductive transducer 16P, as indicated by the arrow 70, may also be desired.

III. THE EMBODIMENT OF FIGURE 3

Reference is now made to FIGURE 3 where a detailed schematic of one embodiment of the block diagram of FIGURE 2 is shown.

The secondary lens system 18 is generally indicated as including an adjustable iris diaphragm 18A therein for controlling the degree of illumination of the photoconductive transducer 16P. In a preferred embodiment of the invention a cadmium sulphide cell is used as the transducer 16P.

Temperature compensation is provided for the transducer 16P by a thermistor 16T connected in series with the transducer via a common intermediate junction 72.

(A) *The bridge circuit*

The bridge circuit 24 includes a pair of power input terminals 74 and 76 and a pair of signal output terminals 78 and 80 arranged, respectively, on alternate diagonals of the bridge circuit 24. First and second fixed value bridge arms comprising fixed resistances 82 and 84 are provided on either side of the second output terminal 80 and are respectively connected from the terminal 80 to the first and second power input terminals 74 and 76.

The thermistor 16T is connected in shunt with a fixed resistor 86 forming an integral part of a third bridge arm comprising additional series connected variable bias resistor 88 and fixed resistor 90, the said third arm extending between the first signal output terminal 78 and the first power input terminal 74 in the order described.

The common junction 72 between the photoconductive transducer 16P and the thermistor 16T is coincident with the first signal output terminal 78. The transducer 16P forms an integral part of the fourth arm of the bridge circuit 24 which comprises an illumination response slope control variable resistor 92 and a fixed resistor 94 in series therewith, connected in shunt across the photoconductive transducer 16P, and connected from the first signal output terminal 78 through a portion of the resistance element 96 and the variable tap 98 of the feedback potentiometer 12F (FIGURE 2) to the second power input terminal 76. The feedback potentiometer 12F is thus an integral part of the fourth arm of the bridge circuit 24.

Power is supplied to the bridge circuit 24 via leads P1 and P2 connected to the power input terminals 74 and 76, respectively, the said leads P1 and P2 extending to a rectifier regulator circuit 38R connected across a first secondary winding 99 of the power transformer 38T.

(B) *The servo amplifier and control circuit*

As was generally indicated in FIGURE 2, and now to be specifically described with reference to FIGURE 3, operating power for the amplifier 30 and control circuit 34C is provided via a regulator and rectifier 38R'. This is shown as comprising a full wave rectifier 100 having a series connected resistor 102 and a pair of Zener diodes 104 and 106 connected in series across the output diagonal thereof. The junction 108 common to the resistor 102 and the first Zener diode 104 forms one bias reference terminal while the junction 110 common to the two Zener diodes 104 and 106 forms the second bias reference terminal for the servo amplifier 30 and control circuit 34c. A first output voltage of the regulator-rectifier 38R' is thus taken across the first Zener diode 104. A load resistor 112 is provided in shunt with the first Zener diode 104 for purposes of stability.

A third bias reference terminal 114 is provided via a series connected sensitivity control variable resistor 116 and fixed resistor 118 connected to the terminal 120 common to the second Zener diode 106 and the rectifier 100. Thus, a second output voltage of the rectifier-regulator 38R' is taken across the second Zener diode 106 and is adapted to be selectively variable via the sensitivity control resistor 116.

The amplifier 30 is shown as comprising a first NPN transistor $Q_1$ having base, emitter, and collector terminals 120, 122 and 124, respectively, and a second NPN transistor $Q_2$ having base, emitter, and collector terminals 126, 128 and 130, respectively.

The collector terminals 124 and 130, respectively, of the first and second transistors $Q_1$ and $Q_2$ are respectively connected to a first common lead 132 at the potential of the first bias reference terminal 108 via dropping resistors 134 and 136.

The base terminals 120 and 126, respectively, of the first and second transistors $Q_1$ and $Q_2$ are respectively connected to the first signal output terminal 78 of the bridge circuit 24 and a second common lead 138 at the potential of the second bias reference terminal 110, which coincides with the second output signal terminal 80 of the bridge circuit 24. Thus, the base terminals 120 and 126 of the first and second transistors $Q_1$ and $Q_2$ comprise the input terminals of the servo amplifier 30.

The emitter terminals 122 and 128, respectively, of the first and second transistors $Q_1$ and $Q_2$ are connected to a third common lead 140 at the potential of the third bias reference terminal 114.

The control circuit 34C for the silicon controlled rectifier power gate 34R is shown to include first and second unijunction transistors $Q_3$ and $Q_4$, respectively associated with the said first and second transistors $Q_1$ and $Q_2$ of the amplifier 30. The first unijunction transistor $Q_3$ includes emitter and first and second base terminals 142, 144 and 146, respectively, and the second unijunction transistor $Q_4$ includes emitter and first and second base terminals 148, 150 and 152, respectively.

The emitter 142 of the first unijunction transistor $Q_3$ is connected directly to the collector 124 of the first NPN transistor $Q_1$ and through a capacitor $C_1$ to the second common bias lead 138.

The emitter 148 of the second unijunction transistor $Q_4$ is connected directly to the collector 130 of the second NPN transistor $Q_2$ and through a capacitor $C_2$ to the second common bias lead 138.

The respective first base terminals 144 and 150 of the first and second unijunction transistors $Q_3$ and $Q_4$ are connected, respectively, via dropping resistors 154 and 156 to the first common bias lead 132. The respective second base terminals 146 and 152 of the first and second unijunction transistors $Q_3$ and $Q_4$ are connected, respectively, through the primarys windings 158 and 160 of first and second output transformers $T_1$ and $T_2$, to the second common bias lead 138.

The output signals generated by the control circuit 34C, as will be hereinafter more fully described, are transmitted to the silicon controlled rectifier power gate 34R via the secondaries 162 and 164 of the first and second output transformers $T_1$ and $T_2$, respectively.

(C) *The silicon controlled rectifier power gate*

The SCR power gate 34R is shown as comprising first and second silicon controlled rectifiers SCR1 and SCR2, each having, respectively, the usual anode electrodes 166 and 168 and cathode electrodes 170 and 172 of conventional rectifiers and each having a grid or control electrode 174 and 176, respectively. The controlled rectifiers are connected in back-to-back fashion (i.e., anode-to-cathode) with the common junction between anode 166 and cathode 172 being connected directly to one side 178 of a second secondary winding 180 of the power input transformer 38T. The common junction between the anode 168 and cathode 170 comprises one terminal 182 of the shutter drive motor 34M, the other terminal 184 thereof being connected directly to the other side 186 of the said second secondary winding 180 of the power input transformer 38T via a lead 188.

The SCR power gate is thus connected to gate direct current of controlled magnitude and direction through the shutter drive motor 34M as will be hereinafter more fully described.

The shutter drive motor is shown as comprising a capacitance type D.C. motor having a capacitance network $C_3$ connected across its terminals.

The secondary 162 of the first output transformer $T_1$ of the control circuit 34C is shunted by a load resistor 190 and connected across the control electrode 174 and cathode 170 of the first controlled rectifier SCR1. The secondary 164 of the second output transformer $T_2$ of the control circuit 34C is shunted by a load resistor 192 and connected across the control electrode 176 and cathode 172 of the second controlled rectifier SCR2. The means for selectively gating electric power through the SCR power gate 34R is thus provided.

The servo loop of the invention is completed by the mechanical drive coupling 52 (also shown in FIGURE 2) indicated as a broken line between the shutter drive servo motor 34M and the cam 194 of the cam drive means 12D and the drive coupling 54 (also shown in FIGURE 2) indicated as a broken line between the said cam 194 and the movable tap 98 on the feedback potentiometer 12F in the bridge circuit 24.

IV. THE EMBODIMENT OF FIGURE 4

Referring now to FIGURE 4, an additional embodiment of the invention is shown which requires a substantially lesser number of components to effect the automatic exposure control desired than indicated in FIGURES 2 and 3. In the description of this embodiment, like numbers to FIGURES 1, 2 and 3 have been used to generally designate like and functionally equivalent parts. Specifically, these elements are the secondary lens system 18, the adjustable iris 18A, the photoconductive transducer 16P, the thermistor 16T, the feedback potentiometer 12F, the bridge circuit 24, the amplifier 30, the SCR control circuit 34C, the SCR power gate 34R and the shutter drive motor 34M.

(A) The bridge circuit

In this embodiment the null balance bridge circuit 24 is of the alternating current type and includes a pair of power input terminals 196 and 198 and a pair of signal output terminals 200 and 202.

The first and second arms of the bridge 24 comprise, respectively, first and second equal inductors 204 and 206 connected, respectively, between the first power input terminal 196 and first signal output terminal 200 and the said first output 200 and the second power input terminal 198. The first signal output 200 comprises the center tap of a secondary winding 208, composed of the two inductors 204 and 206, of a first power input transformer 210 connected to a suitable A.C. power source 212 via a pair of leads 214 and 216.

The third arm of the bridge circuit 24 comprises the thermistor 16T connected in series with a variable bias resistor 218 and a fixed resistor 220 extending in the order described from the second power input terminal 198 to the second signal output terminal 202.

The fourth arm of the bridge circuit 24 comprises photoconductive transducer 16P shunted by an illumination response slope control variable resistor 222, this combination being in series with a portion of the resistance 224 of the feedback potentiometer 12F. The variable tap 226 of the feedback potentiometer 12F coincides with the second signal output terminal 202 to define one end of the said fourth bridge arm which is terminated at its other end by the first power input terminal 196.

(B) The servo amplifier and control circuit

The servo amplifier 30 is shown as comprising a single PNP transistor $Q_5$ having base, emitter and collector terminals 228, 230 and 232, respectively. The base terminal 228 is connected directly to the first signal output terminal 200 of the bridge 24 via a lead 234.

A first common bias lead 236 is provided for both the amplifier 30 and the SCR control circuit 34C, which extends from the second output signal terminal 202 of the bridge 24 to a first bias terminal 238 of a pair of bias supply terminals 238 and 240. The emitter 230 of the transistor $Q_5$ is connected via a dropping resistor 242 to the first bias lead 236. The amplifier input circuit across the two signal output terminals 200 and 202 of the bridge 24 includes a sensitivity controlling variable resistor 244 and a diode 246 connected in parallel between the first bias lead 236, at the potential of the second output signal terminal 202, and the base input lead 234 of the transistor $Q_5$, the anode of the diode 246 being at the potential of the base terminal 228 of the transistor $Q_5$ and, consequently the potential of the first output signal terminal 200.

The SCR control circuit 34C comprises a single unijunction transistor $Q_6$ having an emitter terminal 248 and first and second base terminals 250 and 252, respectively. The first base terminal 250 is connected to the first common bias lead 236 via a dropping resistor 254. The second base terminal 252 is connected to the second bias supply terminal 240 via a second bias lead 256.

The input to the control circuit 34C from the servo amplifier 30 is taken from the collector terminal 232 of the transistor $Q_5$ through an input resistor 258 connected between the said collector terminal 232 and the emitter terminal 248 of the unijunction transistor $Q_6$.

The output circuit for the control circuit 34C comprises a capacitor $C_3$ connected in series with a primary winding 260 of an output transformer T3, and extending from the emitter terminal 248 of the unijunction transisor $Q_6$ and the second bias lead 256.

(C) The silicon controlled rectifier power gate

The SCR power gate 34R is shown as comprising a full wave rectifier bridge 262 having a silicon controlled rectifier SCR3 connected across one diagonal thereof, the anode 264 of the controlled rectifier SCR3 comprising a first terminal on the bridge 262 and the cathode 266 of the controlled rectifier SCR3 comprising a second bridge terminal.

The controlled rectifier SCR3 is provided with a control or grid terminal 268. The input to the controlled rectifier SCR3, whereby the SCR power gate 34R is controlled, is provided by connecting the secondary 270, of the output transformer T3 in the control circuit 34C, across the cathode 266 and control electrode 268 of the controlled rectifier SCR3.

The opposite diagonal terminals 272 and 274 of the rectifier bridge 262 are connected in one side of the power input circuit of the shutter drive motor 34M, the first terminal 272 being connected to one side of a secondary winding 276 of a power transformer 278 at the power source 212 via a lead 280, and the second terminal 274 of the rectifier bridge 262 being connected via a lead 282 to one side of the shutter motor 34M and thence, through the said motor 34M and a lead 284 back to the other side of the said secondary 276 of the power transformer 278. A stabilizing resistor 286 is also shown connected across the motor 34M between the leads 282 and 284.

The servo loop of this embodiment is completed through a mechanical connection 288, indicated as a dotted line, between the motor 34M and the movable tap 226 of the feedback potentiometer 12F in the bridge circuit 24.

To complete the description of the power supply circuits, the bias supply for the amplifier 30 and control circuit 34C comprises a full wave rectifier bridge 290 connected directly to the power source 212 via a pair of diagonally disposed input terminals 292 and 294 and a respective pair of leads 296 and 298.

The opposite pair of diagonally disposed terminals, 300 and 302, in the rectifier bridge 290, are connected, respectively, to the first bias terminal 238 via a dropping resistor 304 and directly to the second bias terminal 240. A Zener diode 306 and load resistor 308 are connected in parallel across the said bias terminals 238 and 240 to complete the bias supply circuit.

V. THE SENSOR AND SHUTTER ADJUSTMENT MEANS

Referring now to FIGURES 5, 6 and 7, the mechanical arrangement and interconnection with respect to the variable shutter means 12, the primary lens system 14, the secondary lens system 18, the photoconductive transducer 16P, the shutter drive motor 34M and the feedback potentiometer 12F will now be described.

As shown in FIGURE 5, an index dial 310 comprising a rotatable knob 312 mounted over a fixed dial plate 314 having a plurality of index markings thereon as shown, is mounted on the face of a control housing 316. The spacing between the index markings is logarithmically varied as will be hereinafter more fully described.

The index dial 310 is mounted directly below the secondary lens assembly 18 which also protrudes from the face of the control housing 316.

As shown in FIGURE 6, the knob 312 of the index dial 310 is mounted on one end of a shaft 318 which extends through a suitable journal (not shown) in the dial plate 314 and terminates in a concentrically mounted drive pulley 320. An endless drive belt or cable 322 extends from the drive pulley 320 to a driven pulley 324 concentrically mounted with respect to a portion of the secondary lens system 18. This provides a means whereby the secondary lens system may be selectively adjusted to regulate the intensity of the light transmitted therethrough.

Referring now to FIGURE 7, the secondary lens system 18 is shown, in cross-section, as including an adjustable iris diaphragm light valve 326 internally concentric with and adjusted by the driven pulley 324. The photoconductive transducer 16P is also shown as being physically mounted in the inner end of the hollow tube 328 housing the secondary lens system 18.

Referring again to FIGURES 5 and 8, the control housing 316 is shown annexed to a main camera housing 330 having an L-shaped integral housing portion 332 partially enveloping the primary lens assembly 14 which encloses the variable shutter means 12, the shutter drive motor 34M, cam drive 12D, cam 194, and the feedback potentiometer 12F.

As shown in FIGURE 6, the amplifier and other control circuitry of the invention, such as described in FIGURES 2 and 4, are housed in the control housing 316 in the form of a prefabricated circuit package generally indicated at 334, suitable electrical leads, not shown, being connected with the shutter drive motor 34M and the feedback potentiometer 12F in the main camera housing 330.

Referring now in more detail to FIGURE 8 and concurrently to FIGURE 9, the shutter drive servo motor 34M is shown mounted in a bracket 336 and connected to drive a worm gear 338 integral with its armature shaft 340.

The worm gear 338 drives a spur gear 342 to thereby drive the variable shutter mechanism 12 and adjust the shutter means therein as fully described in the aforementioned copending application to Gregory, Jr., et al., Ser. No. 156,453, filed Dec. 1, 1961, now Patent No. 3,186,003.

As also shown in FIGURE 9, the spur gear 342 is rotatably journalled on a fixed bearing shaft 344 mounted in the back wall 346 on the L-shaped housing portion 332. A cam drive pinion 348 is also rotatably journalled on the shaft 344 and is made substantially integral with the sector gear 342 by means of splines 350, whereby the said cam drive pinion 348 is effectively driven by the worm gear 338 (not shown in FIGURE 9).

The remainder of the cam drive 12D includes a second fixed bearing shaft 352 mounted in the housing wall 346. Rotatably journalled on the second shaft 352 is a driven pinion 354 intermeshed with the cam drive pinion 348 and integrally keyed to the cam 194 which is also journalled on the said second shaft. A spacer block 356 and integral instrument dial plate 358 for the mechanical shutter angle indicator 62 (also shown in FIGURE 2) are fixed to the cam 194 by a spline or screw 360. The indicator 62 is completed by attaching a meter pointer 362 to the free tip of the second shaft 352.

The feedback potentiometer 12F may now be driven by means of an elongated rod-like cam follower 364 having a compression spring 366 extending from a shoulder 368 on the potentiometer 12F concentric with the follower 364 to the follower head 370 which is in engagement with the cam 194.

VI. OPERATION

Referring first to FIGURES 5, 6 and 7, the index dial 310 has been described as controlling an iris diaphragm 326 or the like which regulates the amount of light reaching the photocell 16P, whereby the automatic exposure control described hereinbefore may be biased for a particular set of operating conditions for the camera 10 (FIGURE 1). These operating conditions are a combination of a particular film speed, camera frame rate, and the f/stop setting of the primary lens systems 14.

Each major scale division on the fixed dial plate 314 of the index dial 310 corresponds to a photographic f/stop, each of which changes the light admitted through a particular lens by a factor of 2, thus requiring logarithmic scaling of the seven (7) major f/stop division on the said dial plate 314.

By turning the rotatable knob 312 of the index dial 310 to a higher f/stop number on the dial plate 314, the iris diaphragm 326 is closed further to decrease the intensity level of the light impinged on the photocell 16P by the secondary lens system 18. As will be hereinafter described, this creates an unbalance in the automatic control system which causes a change in the blade angle setting of the variable rotary shutter means 12 in the primary lens system 14. A rotation of the knob 312 to a lower f/stop number on the dial plate 314 produces an opposite result, increasing the light on the photocell 16P and increasing the shutter angle in the variable shutter means 12.

(A) Operation of FIGURE 1

Referring now to FIGURE 1, once the index dial 310 has been set for the desired operating parameters of the camera 10, a change in illumination in the area to be photographed is detected by the gunsight secondary lens 18 and impinged on the photocell 16P, thus creating an impedance change in the photocell 16P which unbalances the bridge or bridge null detector 24. An output signal representative of the magnitude and direction of the unbalance with respect to the standard prescribed by the initial setting of the index dial 310 is derived from the bridge circuit 24 by the amplifier 30 and applied, via the input 32, to the shutter drive means 34.

The shutter drive means 34 then responds to the output signal from the amplifier 30 to vary the shutter angle in the variable shutter means 12. This shutter variation causes a feedback signal to be generated and applied, via lead 26, to the bridge circuit 24, whereby, when the shutter angle of the variable shutter means 12 is properly adjusted to the condition of illumination in the area to be photographed, the bridge 24 will be balanced and the servo system comprising the automatic exposure control will be at a null in its operation. The system will seek, constantly, to vary the shutter angle in the shutter means 12 in response to changes in illumination in the area to be photographed, hereinafter referred to as the target area.

(B) Operation of FIGURE 2

The operation of the more complex embodiment of FIGURE 2 will now be described.

Assuming again, an initial f/stop setting of the index dial 310 for a particular optimum light condition in the target area as correlated to the particular operating parameters of the camera, a change in the illumination of the target area from the optimum reference will cause an impedance change in the photocell 16P and a resulting unbalance in the bridge circuit 24.

The amplifier 30, via the connection 28, derives an output error signal representative of the magnitude and direction of the bridge unbalance with respect to the reference null intially determined by the setting of the index dial 310 and constrains the SCR control circuit 34C, via the connection 32, to provide control pulses for the SCR power control gate 34R. The control gate 34R, in turn, selectively gates positive or negative direct current signals, of a magnitude proportional to the unbalance in the system, from the power transformer 38T to the shutter drive motor 34M which controls the shutter angle in the variable shutter 12S.

The change in the shutter angle of the variable shutter 12S is transformed into a feedback or error signal by means of a cam drive means 12D which constrains a feedback potentiometer 12F to a corresponding impedance value that is varied until the bridge circuit 24, via a connection 26, is rebalanced and the servo system of the automatic exposure control is brought to a null.

The changes in the shutter angle may be read out via a mechanically positioned local indicator 62 or an electrically actuated remote indicator 60.

(C) Operation of FIGURES 8 and 9

Once the cam drive 12D has been energized by the shutter drive motor 34M in response to any of the various embodiments of SCR power gates 34R of the present invention, the operation of the said cam drive 12D, the variable shutter 12S and the feedback potentiometer 12F are universal as applied to any of the specific embodiments of the invention and is best described at this time.

Rotation of the motor 34M results in rotation of the armature shaft 340 thereof which turns the integral worm gear 338 in the same direction. This direction of rotation is transmitted to the spur gear 342 and the cam drive pinion 348 splined thereto. The cam drive pinion 348 is in engagement with the driven pinion 354 and integral cam 194, whereby the cam 194 is driven in a corresponding direction by the variable shutter drive motor 34M. The local mechanical indicator 62 is driven simultaneously with the cam 194, the dial plate 358, integral with the cam 194, being driven with respect to a fixed pointer 362.

The contour of the cam 194 is a logarithmic function which causes the feedback potentiometer 12F to be repositioned, via the cam follower 364, in proportion to $f$/stop numbers, thus adapting the exposure control system to the operating format of the camera. This becomes clearer when it is considered that the rotational position of the cam 194 is constrained to the shutter angle position, a feedback or error signal calibrated in proportion to $f$/stops thus being essential for proper operation of the exposure control system.

(D) *Operation of FIGURES 3 and 3a*

Variation in target area illumination causes the photo-conductive cell 16P, via the secondary lens system 18, to unbalance the bridge circuit 24 causing an unbalance signal voltage to appear across the bridge output terminals 78 and 80 to which the base terminals 120 and 126, respectively, of the first and second transistors $Q_1$ and $Q_2$ of the amplifier 30 are connected.

The first transistor $Q_1$ comprises a variable load resistor in a relaxation oscillator circuit, said oscillator comprising the resistor 134, capacitor $C_1$ and the first unijunction transistor $Q_3$ of the SCR control circuit 34C.

The second transistor $Q_2$ comprises a variable load resistor in a relaxation oscillator circuit, said oscillator comprising the resistor 136, capacitor $C_2$ and the second unijunction transistor $Q_4$ of the SCR control circuit 34C.

By biasing both of the first and second transistors $Q_1$ and $Q_2$ to an "ON" state for a balanced condition of the bridge circuit 24, the capacitors $C_1$ and $C_2$ in each of the relaxation oscillator circuits are prevented from charging to a sufficient voltage level to trigger the respective unijunction transistors $Q_3$ and $Q_4$.

When an unbalanced condition of the bridge circuit 24 ocurs, however, one of the transistors $Q_1$ or $Q_2$ will be biased to an "OFF" state, depending on the direction of unbalance and the resulting polarity changes at the output terminals 78 and 80 of the bridge 24, whereby the capacitor $C_1$ or $C_2$, respectively, associated therewith, will alternately charge and thence discharge through its associated unijunction transistor, $Q_3$ or $Q_4$, respectively, whereby a series of trigger pulses will be generated in the second base circuit 146 or 152, respectively, of the active unijunction transistor.

The resulting trigger pulses are fed via one of the output transformers $T_1$ or $T_2$ to the proper bias or grid terminal 174 or 176 of the first or second controlled rectifier SCR1 or SCR2, respectively. The trigger pulses, as selectively applied, thus gate direct current power of a proper polarity through the shutter drive motor 34M to thereby drive the variable tap 98 of the feedback potentiometer 12F in the proper direction to rebalance the bridge circuit 24, as already described with respect to FIGURES 8 and 9, causing the oscillations in the control circuit 34C to cease and the motor 34M to stop.

If the parmameters of the relaxation oscillators described above are properly selected such that a full "OFF" state of the controlling transistor $Q_1$ or $Q_2$ is not required for oscillations to commence, then the repetition rate of the trigger pulses can be varied as a function of the magnitude of unbalance. This would effect the rate of compensation provided by the shutter drive motor 34M since the average power gated to the said motor via the SCR power gate 34R could be proportionately increased as a function of the trigger pulse repetition rate.

(E) *Operation of FIGURES 4 and 4a*

In this embodiment, the variation of target area illumination which causes a variation in the impedance of the photo-conductive cell 16P, creates an unbalance in the bridge circuit 24 which produces a signal across the output terminals 200 and 202 which is shifted in phase, in the direction of unbalance, with respect to the voltage of the A.C. power source 212, and having a magnitude which is proportional to the amount of unbalance.

The unbalance signal is applied from the base terminal of the transistor amplifier $Q_5$, which is biased for class B operation, to the common lead 236 connected via the bias resistor 242 to the emitter terminal 242 of the transistor $Q_5$. The bias resistor 242, emitter-to-collector path of the transistor $Q_5$ and a coupling resistor 258 connected from the collector 232 of the said transistor $Q_5$ to the emitter terminal 248 of the unijunction transistor $Q_6$ in the SCR control circuit 34C, comprise a resistive load line controlled by the unbalance signal from the bridge circuit whereby the charging rate of the input capacitor C3 in the SCR control circuit 34C is controlled.

Thus, as hereinbefore similarly described with respect to FIGURES 3 and 3a, the SCR control circuit 34C comprises a relaxation oscillator whose frequency of operation is determined by the unbalance signal from the bridge 24 acting through the transistor $Q_6$ in the amplifier 30. When the charge on the capacitor C3 is sufficient to supply the peak voltage to the emitter 248 of the unijunction transistor $Q_6$ and bias same into its negative resistance region, the capacitor C3 will discharge through the unijunction transistor $Q_6$ causing the generation of a trigger pulse in the second base path 252–256 and in the primary 260 of the output transformer T3.

Since the SCR control circuit 34R and the bridge circuit 24 are both fed in phase one with the other from the same A.C. source 212, the timing of the trigger pulses applied to the grid electrode 268 of the controlled rectifier SCR3 are such as to gate only selected portions of alternate half-cycles of A.C. voltage through the rectifier bridge of the SCR power gate 34R, whereby the magnitude and polarity of the resulting direct current voltage applied to the shutter drive motor 34M via leads 282 and 284 will be proportional to the magnitude and direction of unbalance in the bridge circuit 24.

The motor 34M, as hereinbefore described with respect to FIGURES 8 and 9, drives the variable tap 226 of the feedback potentiometer 12F to adjust the impedance value in that arm of the bridge 24 which contains the photoconductive cell 16P such that the bridge 24 will be rebalanced and the automatic exposure control system will reach a null.

In both of the embodiments of FIGURES 3–3a and 4–4a, the resistance change produced in the fourth arm of the bridge 24 by way of temperature change of the photocell 16P is immediately followed by a like resistance change in the third arm of the said bridge by means of the thermistor 16T whereby no unbalance results over a wide temperature range.

At this point it should be noted that the use of the feedback potentiometer 12F as the feedback means of the invention is only exemplary. For instance, instead of the potentiometer 12F, a variable density light filter (70, FIGURE 2) may be inserted between the secondary lens system 18 and the photocell 16P and the density thereof constrained by the feedback action now exerted by the cam drive 12D on the present potentiometer 12F to thereby vary the effect of the illumination from the target area on the photocell 16P whereby the resistance thereof could be selectively varied to rebalance the bridge circuit 24.

Another specific feature of the invention with respect to the bridge circuits 24 is that all feedback actions effect an adjustment in the impedance in that leg of the bridge 24 where it is initially varied, thus presenting a substantially constant input impedance to the amplifier 30 and providing good stability in the system.

As can be seen from the foregoing specification and drawings, this invention provides a new and novel automatic exposure control which is properly adapted to the operating format of the camera with which it is associated and which provides a true and rapid response to variations in target area illumination with a high degree of stability.

It is to be understood that the various embodiments shown and described herein are for the purpose of example only and are not intended to limit the scope of the appended claims.

What is claimed is:

1. Servo means for automatically adjusting a first operating parameter in the operating format of a device in response to variations in a second operating parameter thereof with respect to a preselected optimum reference value of said second parameter comprising, transducer means, means for biasing said transducer means to said optimum reference value of said second operating parameter, a null balance means including said transducer means, said transducer means being responsive to said second parameter to unbalance said null balance means as a function of the magnitude and direction of the said variations in said second operating parameter, said null balance means producing an output signal as a function of the unbalance therein, a trigger generating means, means for coupling said output signal to said trigger generating means, said trigger means producing trigger pulses having a repetition rate which is a function of the characteristics of said output signal, a power source, drive means energized from said power source, a power control gate means connected between said power source and said drive means and coupled with said trigger means whereby power is selectively gated from said power source to said drive means by said trigger pulses as a function of said unbalance in said null balance means, said drive means being connected with said device to thereby adjust said first operating parameter, said null balance means including feedback means connected with said drive means, whereby said null balance means is rebalanced and said servo means is constrained to a null when said first parameter is properly adjusted with respect to said second parameter.

2. The invention defined in claim 1, wherein said transducer means comprises variable impedance means, said impedance being varied as a function of the variations in said second operating parameter, and said null balance means comprises a bridge circuit having said variable impedance means connected therein.

3. The invention defined in claim 1, wherein said trigger generating means comprises a relaxation oscillator circuit and wherein said means for connecting said output signal from said null-balance means to said trigger generating means includes a variable load impedance for said oscillator circuit selectively varied as a function of said output signal.

4. The invention defined in claim 3, wherein said variable load impedance includes a transistor having a base terminal connected to said null-balance means for receiving said output signal and emitter and collector terminals connected in circuit with said relaxation oscillator whereby the emitter-collector impedance of said transistor is varied as a function of said output signal.

5. The invention defined in claim 3, wherein said variable load impedance includes a transistor having a base terminal connected to said null-balance means for receiving said output signal and emitter and collector terminals connected in circuit with said relaxation oscillator whereby the emitter-collector impedance of said transistor is varied as a function of said output signal and wherein said relaxation oscillator circuit includes a unijunction transistor having first and second base circuits and an emitter circuit, a capacitor connected in said emitter circuit and having a charging rate controlled by said variable impedance means in response to said output signal from said null balance means, and a trigger pulse output coupling means in said second base circuit.

6. The invention defined in claim 1, wherein said power control gate means includes silicon controlled rectifier means selectively energized by said trigger pulses from said trigger pulse generating means to selectively gate direct current energy of the proper magnitude and polarity from said power source to said drive means, said drive means comprising a direct current motor and said power source being one of alternating current.

7. The invention defined in claim 6, wherein said silicon controlled rectifier means comprises a pair of silicon controlled rectifiers having anode, cathode and control terminals, respectively, said rectifiers being mutually connected anode-to-cathode between one side of said drive means and one side of said power source, said control terminals of said rectifiers being connected with said trigger pulse generating means.

8. The invention defined in claim 6, wherein said silicon controlled rectifier means comprises a full-wave diode bridge circuit connected across one diagonal thereof from one side of said drive means to one side of said power source and a silicon controlled rectifier having anode, cathode and control terminals, said controlled rectifier being connected anode-to-cathode across the other diagonal of said diode bridge circuit and having its control terminal connected with said trigger pulse generating means.

9. The invention defined in claim 1, wherein said feedback means comprises cam means driven by said drive means, follower means driven by said cam means, and compensating means, driven by said follower means, acting to oppose the unbalance in said null balance means created by said transducer means as said servo means constrains said first parameter as a function of the variations in said second parameter.

10. The invention defined in claim 9, wherein said cam is provided with a contour functionally related to the said operating format of said device, whereby the compensating action of said compensating means in opposition to said unbalance is correlated to the said operating format.

11. The invention defined in claim 1, wherein said reference means comprises calibrated means for selectively varying the response of said transducer means to predetermined values of said second operating parameter, said calibrated means being calibrated as a direct function of said first operating parameter as represented by the operating format of the said device.

12. The invention defined in claim 1, wherein said null balance means comprises a four arm impedance bridge, said transducer means includes a condition responsive variable impedance means, and said feedback means includes a variable compensating impedance means, said condition responsive variable impedance means and said variable compensating impedance means being connected in the same arm of said bridge, whereby the impedance presented by said bridge to said means for coupling said output signal to said trigger generating means is a constant.

13. The invention defined in claim 12, wherein said transducer means includes a temperature compensating impedance connected in another arm of said bridge adjacent said same arm whereby changes in ambient temperature affecting said condition responsive variable impedance means are balanced out in said null balance means.

References Cited

UNITED STATES PATENTS

| | | | |
|---|---|---|---|
| 2,724,795 | 11/1955 | Rusler | 318—341 X |
| 3,003,096 | 10/1961 | Du Bois | 318—207 |
| 3,150,303 | 9/1964 | James et al. | 318—28 |
| 3,181,051 | 4/1965 | Marshall | 318—345 |
| 3,191,114 | 6/1965 | Gargani | 318—340 X |

BENJAMIN DOBECK, *Primary Examiner.*

JOHN F. COUCH, ORIS L. RADER, *Examiners.*